US008060551B2

(12) United States Patent
Avss et al.

(10) Patent No.: US 8,060,551 B2
(45) Date of Patent: Nov. 15, 2011

(54) METHOD AND APPARATUS FOR INTEGER DIVISION

(75) Inventors: Prasad Avss, Bangalore (IN); Ravi Pathakota, Proddatur (IN)

(73) Assignee: Agere Systems Inc., Allentown, PA (US)

( * ) Notice: Subject to any disclaimer, the term of this patent is extended or adjusted under 35 U.S.C. 154(b) by 989 days.

(21) Appl. No.: 11/967,251

(22) Filed: Dec. 30, 2007

(65) Prior Publication Data

US 2009/0172069 A1      Jul. 2, 2009

(51) Int. Cl.
*G06F 7/52* (2006.01)
(52) U.S. Cl. ...................................................... 708/653
(58) Field of Classification Search ........... 708/650–656
See application file for complete search history.

(56) References Cited

U.S. PATENT DOCUMENTS

| 5,661,674 A * | 8/1997 | Smith, Sr. ..................... 708/650 |
| 7,672,990 B2 * | 3/2010 | Dupaquis et al. ............. 708/654 |
| 2005/0289209 A1 * | 12/2005 | Robison ........................ 708/650 |

* cited by examiner

*Primary Examiner* — Tan V Mai
(74) *Attorney, Agent, or Firm* — Ryan, Mason & Lewis, LLP

(57) ABSTRACT

A method, arithmetic divider unit, and system are disclosed for dividing a dividend $D_{ZM\ldots Z0}$ having a most significant bit $Z_M$ and a plurality of less significant bits $Z_{M-1}$ through $Z_0$ by a divisor $R_{ZN\ldots Z0}$ having a most significant bit $Z_N$ and a plurality of less significant bits $Z_{N-1}$ through $Z_0$. The method, arithmetic divisor unit, and system round the divisor to the next significant bit greater than the divisor's most significant bit $Z_N$ to produce a first partial divisor $R_{ZN+1}$, divide the dividend $D_{ZM\ldots Z0}$ by the first partial divisor $R_{ZN+1}$ to produce a first partial quotient $Q_N$, calculate one or more additional partial quotients based on one or more divisor bits selected from the plurality of divisor bits $Z_{N-1}$ through $Z_0$, and add the first partial quotient $Q_N$ and one or more additional partial quotients to produce an estimated final quotient.

20 Claims, 2 Drawing Sheets

METHOD AND APPARATUS FOR INTEGER DIVISION

FIELD OF THE INVENTION

The present invention relates generally to a processor including an arithmetic logic unit and preferably including a divider unit performing integer division within such processor.

BACKGROUND OF THE INVENTION

Digital devices perform a variety of arithmetic operations on binary numerical data. A processor within such digital devices includes a major subdivision called an arithmetic logic unit (ALU). The ALU performs a variety of data processing and arithmetic operations under the control of the processor. Although early processors had only one ALU, modern chips may have several ALUs, which may be classed into two types. One basic type of ALU is an integer unit which carries out simple integer mathematical operations including add, subtract, multiply, shift and logical instructions. More powerful processors also may include a second type of ALU, referred to as a floating-point unit, that handles advanced math operations on numbers with a wider range than simple integers (such as 1.03.times.10.sup.-19 for example.) Floating-point units use separate, dedicated instructions for their advanced functions.

The basic integer unit may also include a dedicated divider to perform arithmetic division. Because floating-point numbers and integers are represented differently in binary, and because the operations differ as a result, separate floating point and integer dividers are generally provided. Typically, floating point division is considered to be more important for high-demand applications, such as graphics and multimedia applications. Also, integer division is not performed with the same frequency as other mathematical operations. And so, many manufacturers save die real estate by providing only the most basic single bit per cycle (radix-2) integer divider, which reduces performance.

The integer divider commonly operates based on one of a variety of well-known subtractive algorithms. Subtractive algorithms each include a sequence of shift, subtract, and compare operations. Among subtractive algorithms, restoring, non-restoring, non-performing, and the Sweeney, Robertson, and Tocher (SRT) division algorithms are known. These division algorithms tend to be very slow in generating quotient values.

For example, one conventional subtractive division technique for binary numbers works similarly to standard long division in base-10 numbers. Each digit of the dividend, starting with the most significant digit, is compared to the divisor, and a digit of the quotient is computed. In computers, this is accomplished by the typical one bit per cycle (radix-2) integer divider by aligning the most significant bit of the dividend with the least significant bit of the divisor, subtracting the aligned digits, shifting the partial remainder to the left, subtracting, shifting again, and so on. For a 64-bit number, the minimum number of cycles is 64, plus several cycles for setting up the computation. Even in cases where the numbers have significantly fewer digits or the dividend is smaller than the divisor (a case which always results in zero for integer numbers) the entire process is performed. Thus, even radix-4 and radix-8 integer dividers, which process multiple bits per cycle, can be very inefficient.

An exemplary prior art non-restoring integer divider 20 is schematically represented in FIG. 1. The 64-bit dividend is right shifted by 63 bits using concatenation 22. The concatenated 128 bit word is stored in flip-flop 26. The left 65 bits, including one sign bit and the 64 bit partial remainder are read out and added in adder 34. The divisor is stored in flip-flop 28, converted into its two's compliment form using XOR 32, and added in carry-lookahead adder 34. The result from adder 34 is the partial remainder from which quotient digit 38 q(i) is calculated. Concatenation 36 combines the right 63 bits from split 29 with result from adder 34 and q(i). The cycle repeats 64 times and the final result is stored in the least significant 64 bits of flip-flop 26.

It would be desirable to improve the performance of integer division and to reduce real estate requirements on the integrated circuit die while at the same time improving division performance on integer numbers.

SUMMARY OF THE INVENTION

Broadly speaking, the present invention fills these needs by providing a fast and efficient method and device for dividing an integer dividend by an integer divisor.

It should be appreciated that the present invention can be implemented in numerous ways, including as a process, an apparatus, a system, a device, or a method. Several inventive embodiments of the present invention are described below.

In one embodiment, the invention provides a method for dividing a dividend $D_{ZM \ldots Z0}$ having a most significant bit $Z_M$ and a plurality of less significant bits $Z_{M-1}$ through $Z_0$ by a divisor $R_{ZN \ldots Z0}$ having a most significant bit $Z_N$ and a plurality of less significant bits $Z_{N-1}$ through $Z_0$. The method includes: rounding the divisor to the next significant bit greater than the divisor's most significant bit $Z_N$ to produce a first partial divisor $R_{ZN+1}$; dividing the dividend $D_{ZM \ldots Z0}$ by the first partial divisor $R_{ZN+1}$ to produce a first partial quotient $Q_N$; calculating one or more additional partial quotients based on one or more divisor bits selected from the plurality of divisor bits $Z_{N-1}$ through $Z_0$; and adding the first partial quotient $Q_N$ and one or more additional partial quotients to produce an estimated final quotient.

In another embodiment, the invention provides an arithmetic divider unit for dividing a dividend $D_{ZM \ldots Z0}$ having a most significant bit $Z_M$ and a plurality of less significant bits $Z_{M-1}$ through $Z_0$ by a divisor $R_{ZN \ldots Z0}$ having a most significant bit $Z_N$ and a plurality of less significant bits $Z_{N-1}$ through $Z_0$. The arithmetic divider unit includes: arithmetic logic capable of rounding the divisor to the next significant bit greater than the divisor's most significant bit $Z_N$ to produce a first partial divisor $R_{ZN+1}$; shift logic capable of dividing the dividend $D_{ZM \ldots Z0}$ by the first partial divisor $R_{ZN+1}$ to produce a first partial quotient $Q_N$; processing logic capable of calculating one or more additional partial quotients based on one or more divisor bits selected from the plurality of divisor bits $Z_{N-1}$ through $Z_0$; and adder logic adding the first partial quotient $Q_N$ and one or more additional partial quotients to produce an estimated final quotient.

In yet another embodiment, the invention provides a system for dividing a dividend $D_{ZM \ldots Z0}$ having a most significant bit $Z_M$ and a plurality of less significant bits $Z_{M-1}$ through $Z_0$ by a divisor $R_{ZN \ldots Z0}$ having a most significant bit $Z_N$ and a plurality of less significant bits $Z_{N-1}$ through $Z_0$. The system includes a processor configured to execute the following steps: rounding the divisor to the next significant bit greater than the divisor's most significant bit $Z_N$ to produce a first partial divisor $R_{ZN+1}$; dividing the dividend $D_{ZM \ldots Z0}$ by the first partial divisor $R_{ZN+1}$ to produce a first partial quotient $Q_N$; calculating one or more additional partial quotients based on one or more divisor bits selected from the plurality of divisor bits $Z_{N-1}$ through $Z_0$; and adding the first partial quotient $Q_N$ and one or more additional partial quotients to produce an estimated final quotient.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The integer division algorithm of the present invention may be implemented as a sequence of steps within a processor lacking a dedicated divider but having a basic ALU including add, subtract, multiply, shift, and logical instructions. In an alternative embodiment, the integer divider may be implemented in hardware as a separate divider unit using conventional combinational logic blocks in accordance with known techniques.

Figure 1:
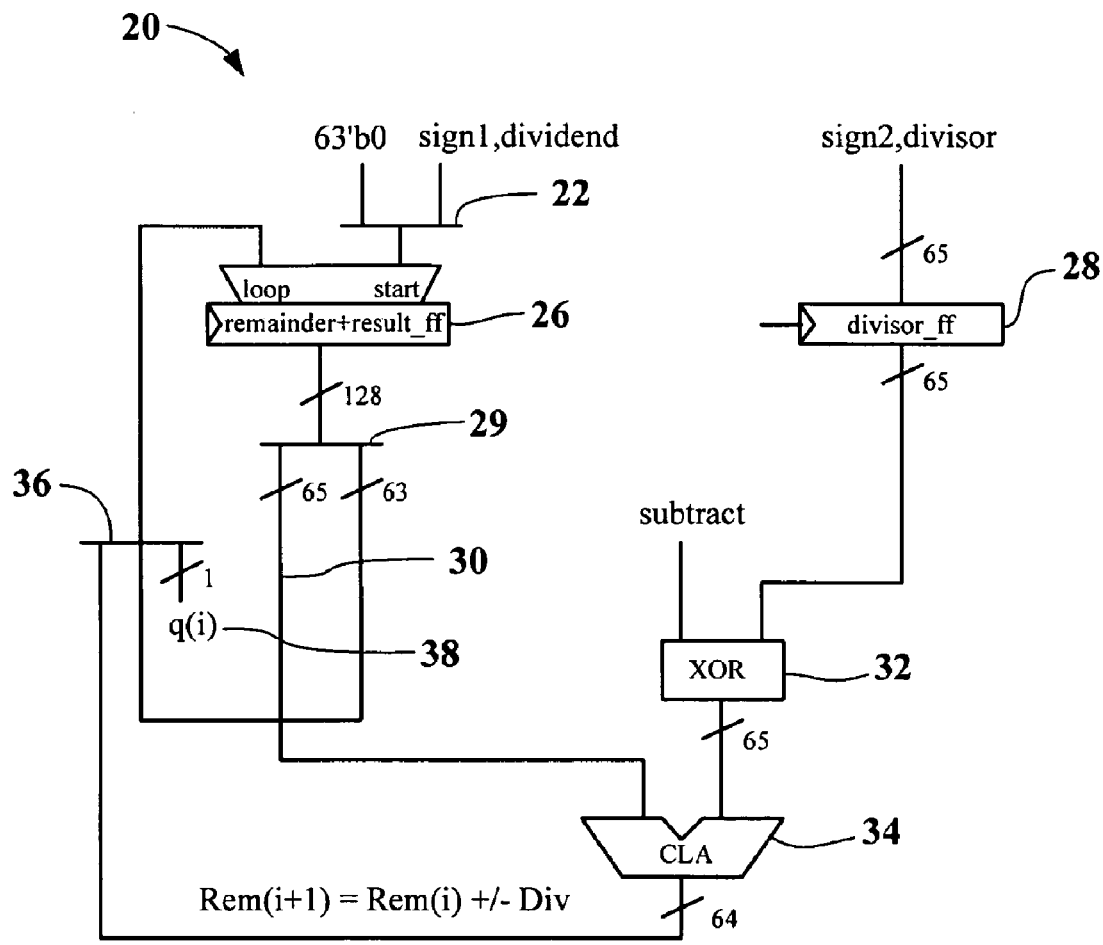
FIG. 1 shows an implementation schematic for an exemplary prior art non-restoring integer divider.
Figure 2:
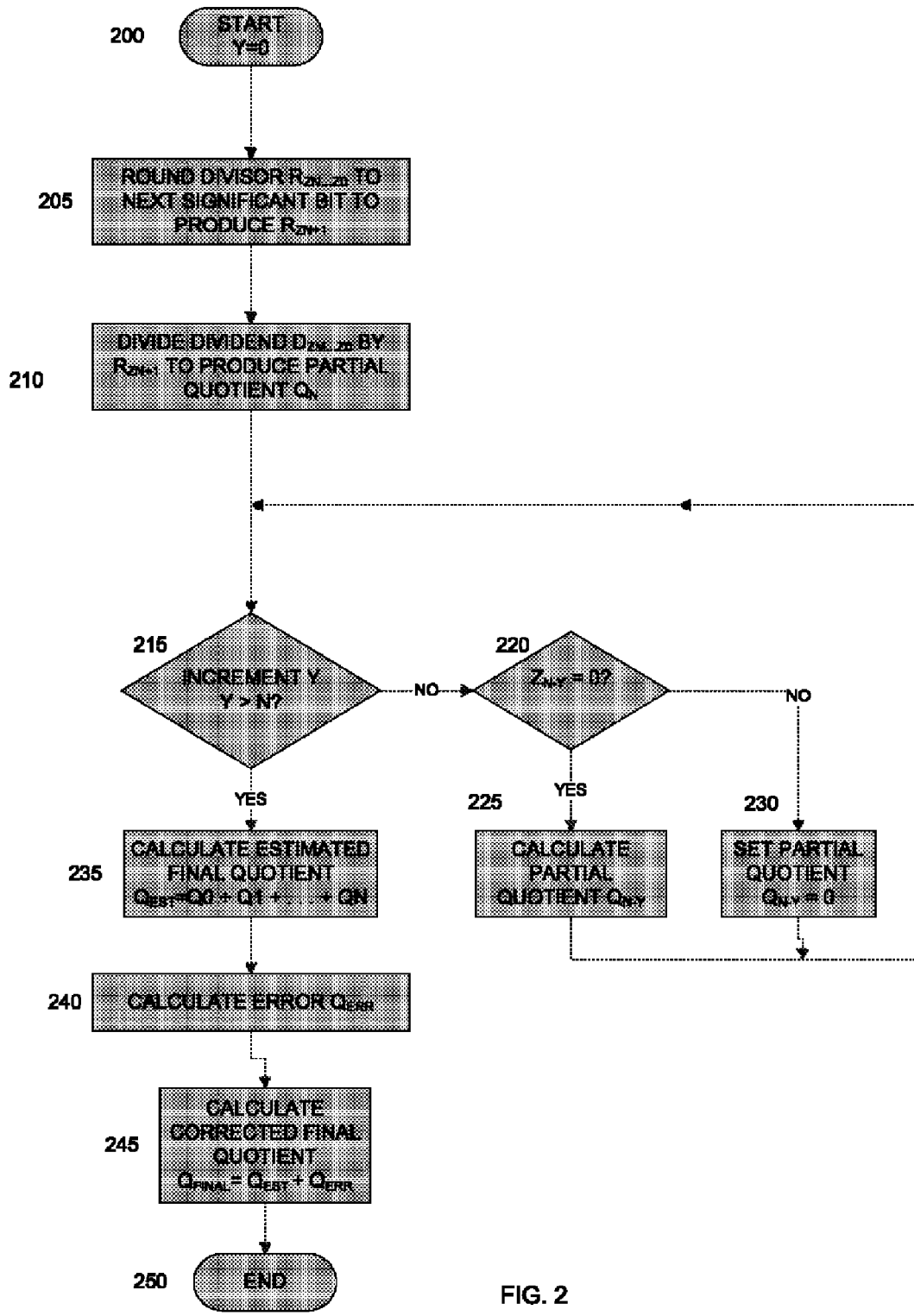
FIG. 2 shows a flowchart describing an exemplary method for efficiently carrying out integer division.

FIG. 2 shows a flowchart describing an exemplary method for efficiently carrying out integer division, given a dividend D having bits $Z_M \ldots Z_0$ and a divisor R having bits $Z_N \ldots Z_0$. Bit $Z_M$ is the most significant bit (MSB) of the dividend D, and bit $Z_N$ is the MSB of divisor R. Further, M is assumed to be greater than N.

Dividend D and divisor R may include leading zeros before the MSB bits $Z_M$ and $Z_N$. Such leading zeros may be eliminated by scanning dividend D and divisor R from the left to identify the first bit position that has a value of '1' and then dropping any leading zeros.

The procedure starts in detail at block 200 as shown. In step 205, the divisor $R_{ZN\ldots Z0}$ is rounded to the next significant bit greater than the divisor's most significant bit $Z_N$ to produce a partial divisor $R_{ZN+1}$. For binary division, this step may be performed by taking the highest bit position (MSB) in the divisor R and multiplying it by 2 (e.g., via a multiply subunit or a shift register unit). Next, in step 210, the dividend $D_{ZM\ldots Z0}$ is divided by the partial divisor $R_{ZN+1}$ to produce a first partial quotient $Q_N$. This division can be accomplished, for example, by performing a right shift operation, e.g., via a shift register.

In steps 215 through 230, additional partial quotients are calculated iteratively for each remaining divisor bit $Z_{N-1}$ through $Z_0$ having a binary value of "0." For the sake of illustration and not by way of limitation, in the method depicted in FIG. 2, a counter Y is used to step through each remaining divisor bit $Z_{N-1}$ through $Z_0$ of the divisor R.

In step 215, counter Y is incremented (from an initial starting value of zero), and a comparison is made between the counter Y and the number of bits N of divisor R.

In block 220, assuming that the value of counter Y is equal to or less than the number of bits N in divisor R, the bit value $R_{ZN-Y}$ is compared to a binary value "0." If divisor bit value $R_{ZN-Y}$ is equal to zero, then operation continues in block 225. In block 225, a partial quotient $Q_{N-Y}$ is calculated, preferably iteratively, by dividing the previously calculated partial quotient $Q_{N+1-Y}$, by a binary 2 (e.g., via a shift register unit), except where the previously calculated partial quotient is zero. In the case where the previously calculated partial quotient is zero (and the value $R_{ZN-Y}$ is equal to zero), the new quotient value is preferably computed by dividing $Q_N$ by $2^Y$, which computation can be performed by a shift register) If divisor bit value $R_{ZN-Y}$ is one, however, then in block 230 the partial quotient $Q_{N-Y}$ is set to a value of zero.

Finally, in step 235, the partial quotients $Q_0$ through $Q_N$ calculated in step 225 are added together to produce an estimated final quotient $Q_{EST}$. The estimated final quotient $Q_{EST}$ represents a good approximation of the value that would be obtained using conventional long binary division. Further, the estimated final quotient $Q_{EST}$ may be very quickly obtained, especially when the above method is implemented in hardware via combinational logic.

An example of the method described above with reference to steps 200 through 235 follows, given the following 8-bit dividend D and 4-bit divisor $R_{ZN\ldots Z0}$ (where N=3):

$$\frac{D_{Z7Z6Z5Z4\_Z3Z2Z1Z0}}{R_{Z3Z2Z1Z0}} = \frac{1010\_1001}{1010}$$

In this example, in step 205 of FIG. 2, the divisor $R_{ZN\ldots Z0}$=1010 is rounded to the next significant bit greater than the divisor's most significant bit. Partial divisor $R_{ZN+1}$ would thus be binary 10000 (decimal 16). Next, in step 210, the dividend D=1010__1001 is divided by the partial divisor $R_{ZN+1}$ (i.e., binary 10000) to produce the first partial quotient $Q_3$=1010. In step 215, counter Y is incremented from 0 to 1 and then compared to N of 3. After incrementing, counter Y equals one, which is not greater than N, and operation thus continues to step 220. In step 220, the bit value of the second most significant bit $Z_2$ of the divisor R is compared to zero. Because divisor bit $R_{Z2}$=0, operation proceeds to step 225, in which the second partial quotient $Q_2$ is calculated by dividing $Q_3$ by the value 2, as follows:

$$Q_2=Q_3/2=1010/2=101.$$

Operation again returns to step 215, and counter Y is incremented from 1 to 2. After incrementing, counter Y equals two, which is not greater than N=3, and operation thus continues to step 220. In step 220, the bit value of the third most significant bit $Z_1$ of the divisor R is compared to zero. Because divisor bit $R_{Z1}$=1, operation proceeds to step 230, in which the third partial quotient $Q_1$ is set to zero.

Finally in this example, operation yet again returns to step 215. Counter Y is incremented from 2 to 3 and then compared to N of 3. After incrementing, counter Y equals three, which is not greater than N=3, and operation thus proceeds again to step 220. In step 220, the bit value of the least significant bit $Z_0$ of the divisor R is compared to zero. Because divisor bit $R_{Z0}$=0, operation again proceeds to step 225, in which the fourth partial quotient $Q_0$ is calculated by dividing $Q_2$ by the value 4, as follows:

$$Q_0=Q_2/4=101/4=1.$$

Finally, in step 235 in this example, the estimated final quotient $Q_{EST}$ is obtained by summing all of the partial quotients $Q_0 \ldots Q_3$.

$$Q_{EST}=Q_3+Q_2+Q_1+Q_3=1010+101+0+1=16$$

The estimated quotient $Q_{EST}$ obtained in step 235 may include an error component $Q_{ERR}$. The present inventors have determined that the accuracy of the present method for division may be improved by performing an error correction calculation, because the error $Q_{ERR}$ that is introduced by the above method is determinative. Accordingly, in step 240 the error $Q_{ERR}$ is calculated, and in step 245 the corrected final quotient $Q_{FINAL}$ is determined by calculating $Q_{EST}+Q_{ERR}$.

An exemplary formula for determining the error $Q_{ERR}$ is derived as follows.

The first approximation in the present method for division is performed in step 205, when the divisor $R_{ZN \ldots Z0}$ is rounded to the next significant bit. In so doing, one assumes that all bits in the divisor $R_{ZN \ldots Z0}$ are zero except the most significant bit $R_{ZN}$ (having value '1'), when scanned from the left. This most significant bit $R_{ZN}$ is rounded by shifting left by one bit. The resulting rounded value (e.g., $R_{ZN+1}=10000$) will always be at least one bit-value greater than the maximum possible value of the divisor—i.e., the case where all of the divisor bits have a value of '1' (e.g., $R_{ZN \ldots Z0}=1111$). Further, where the rounded value $R_{ZN+1}$ equals the divisor $R_{ZN \ldots Z0}+1$, no correctable error exists. Thus, an error will arise only where the lesser significant bits (i.e., all of the divisor bits excluding the MSB) do not all equal 1. In that event, the estimated quotient value must be increased by the error $Q_{ERR}$.

In order to derive the amount by which the estimated quotient should be increased, one may consider a 4-bit binary number Z including bits $Z_3 Z_2 Z_1 Z_0$ (where $Z_3$ is the MSB). The method for division performed in steps 200 through 235 may then be written in equation form as follows:

$$\frac{1}{Z} \approx \frac{1}{16} + Z'_2 \frac{1}{32} + Z'_1 \frac{1}{64} + Z'_0 \frac{1}{128} \quad (1)$$

where $Z'_x$ is the one's complement of $Z_x$, and $Z_3$, as the most significant bit of the divisor, is assumed to equal '1'. This equation may be rewritten as $$\frac{1}{Z} \approx \frac{8 + 4Z'_2 + 2Z'_1 + Z'_0}{128}$$

and further rewritten as $$Z(8+4Z'_2+2Z'_1+Z'_0) \approx 128 \quad (2)$$

By letting A equal $Z_2 Z_1 Z_0$ and substituting 8+A into the equation for Z, equation (1) may now be rewritten as $$\frac{1}{(8+A)} \approx \frac{(8+A')}{128} \quad (3)$$

where A is Z2Z1Z0 and A' is one's complement of A (i.e., $A'=Z'_2 Z'_1 Z'_0$).

Further, the relationship between the accurate corrected final quotient $Q_{FINAL}$, the estimated final quotient $Q_{EST}$ and the definite error $Q_{ERR}$ in the quotient is given by:

$$Q_{FINAL} = Q_{EST}(1+Q_{ERR}) \quad (4)$$

By using equations (3) and (4), $$\frac{1}{(8+A)} \approx \frac{(8+A')}{128} * (1+Q_{ERR})$$

By introducing the definite error quantity $Q_{ERR}$, the left hand side of this resulting equation may now be defined to be exactly equal, rather than merely approximately equal, to the right hand side of the equation. Simplifying this further, one obtains $$(8+A)(8+A')*(1+Q_{ERR}) = 128$$

$$1+Q_{ERR} = \frac{128}{(120+AA')}$$

where A+A' is always equal to 7. Thus, the error $Q_{ERR}$ may be accurately determined by the equation:

$$Q_{ERR} = \frac{(8-AA')}{(120+AA')} \quad (5)$$

Because equation (5) itself requires a division operation, it is desirable to simplify this error equation by providing an error estimation (or mapping) algorithm that may be implemented in hardware using a shift operation rather than a division operation.

Toward this end, the above theory for deriving the error quotient may be extended to include the generic case with n-bit divisor (with MSB as '1'):

$$\frac{1}{Z} \approx \frac{1}{2^n} + Z'_{(n-2)} \frac{1}{2^{(n+1)}} + Z'_{(n-3)} \frac{1}{2^{(n+2)}} + \ldots + Z'_0 \frac{1}{2^{(n+n-1)}} \quad (6)$$

Since the MSB (i.e., the nth bit) is always 1, the bits in divisor Z may be written as $$Z=1 \, Z_{n-2} \, Z_{n-3} \, Z_{n-4} \ldots Z_0$$

Letting $A=(Z_{n-2} \, Z_{n-3} \, Z_{n-4} \ldots Z_0)$, divisor Z may be rewritten as $$Z = 2^{n-1} + A$$

Equation (6) may then be written as:

$$\frac{1}{(2^{(n-1)}+A)} = \frac{(2^{(n-1)}+A')}{(2^{(2n-1)})} * (1+Q_{ERR}) \quad (7)$$

$$2^{(2n-1)} = (2^{(n-1)}+A')*(2^{(n-1)}+A)*(1+Q_{ERR}) \quad (8)$$

$$2^{(2n-1)} = \{(2^{(2n-2)} + 2^{(n-1)}*(A'+A) + AA'\}*(1+Q_{ERR}) \quad (9)$$

Because A+A' is always equal to $2^{(n-1)}-1$, is equation (9) may be further rewritten as:

$$2^{(2n-1)} = \{2^{(2n-2)} + 2^{(n-1)}*(2^{(n-1)}-1) + AA'\}*(1+Q_{ERR}) \quad (10)$$

$$2^{(2n-1)} = \{2^{(2n-2)} + 2^{(2n-2)} - 2^{(n-1)} + AA'\}*(1+Q_{ERR}) \quad (11)$$

$$2^{(2n-1)} = \{2^{(2n-1)} - 2^{(n-1)} + AA'\}*(1+Q_{ERR}) \quad (12)$$

$$(1+Q_{ERR}) = \frac{2^{(2n-1)}}{2^{(2n-1)} - 2^{(n-1)} + AA'} \quad (13)$$

$$Q_{ERR} = \frac{2^{(2n-1)}}{2^{(2n-1)} - 2^{(n-1)} + AA'} - 1 = \frac{2^{(n-1)} - AA'}{2^{(2n-1)} - (2^{(n-1)} - AA')} \quad (14)$$

Letting the numerator be 'P', then $$Q_{ERR} = \frac{P}{2^{(2n-1)} - P}, \text{ where} \Rightarrow P = (2^{(n-1)} - AA') \quad (15)$$

$$Q_{ERR} = \frac{P}{2^{(2n-1)}} * \left(\frac{1}{1 - \frac{P}{2^{(2n-1)}}}\right) = \frac{P}{2^{(2n-1)}} * \left(1 - \frac{P}{2^{(2n-1)}}\right)^{-1} \quad (16)$$

By using the well-known series expansion, one may write $(1-q)^{-1}$ as $(1+q+q^2+q^3+\ldots)$, if q is less than 1. In the above expression, $(P/(2^{2n-1}))$ is always less than '1'. Accordingly, $$Q_{ERR} = \frac{P}{2^{(2n-1)}} * \left(1 + \frac{P}{2^{(2n-1)}} + \left[\frac{P}{2^{(2n-1)}}\right]^2 + \left[\frac{P}{2^{(2n-1)}}\right]^3 + \ldots\right) \quad (17)$$

This equation (17) may be further rewritten in final form as:

$$Q_{ERR} = \left(\frac{P}{2^{(2n-1)}} + \left[\frac{P}{2^{(2n-1)}}\right]^2 + \left[\frac{P}{2^{(2n-1)}}\right]^3 + \ldots\right), \quad (18)$$

where $$P = (2^{(n-1)} - AA')$$

This resulting equation (18) for error estimation may be implemented in hardware or software using multiplication, subtraction and shift modules, which are relatively fast and which require less space on an integrated circuit than a division module.

It will be recognized that the error estimation equation (18) still introduces a small amount of error, because in practice the number of series expansion terms must be finite and limited. The number of terms may be increased or decreased in accordance with the invention, based on the needs of the application for accuracy and speed and on the hardware and software that is available. In a preferred embodiment, the number of terms for the error correction may be determined based on the difference between the dividend and the divisor. For example, if the dividend is a 32 bit number (with MSB as '1') and the divisor is a 2-bit number (with MSB '1'), then about 13 terms are needed to ensure that the error in the quotient is less than a bit value of '1'. Alternatively, for a 32-bit dividend and a 4-bit divisor (with MSB '1'), then about 7 terms are needed to ensure that the error in the quotient is less than a bit value of '1'.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for dividing a dividend $D_{ZM \ldots Z0}$ having a most significant bit and a plurality of less significant bits by a divisor having a most significant bit $Z_N$ and a plurality of less significant bits $Z_{N-1}$ through $Z_0$ comprising the steps of:
 rounding the divisor to the next significant bit greater than the divisor's most significant bit $Z_N$ to produce a first partial divisor $R_{ZN+1}$;
 dividing the dividend $D_{ZM \ldots Z0}$ by the first partial divisor $R_{ZN+1}$ to produce a first partial quotient $Q_N$;
 calculating one or more additional partial quotients based on one or more divisor bits selected from the plurality of divisor bits $Z_{N-1}$ through $Z_0$; and
 adding the first partial quotient $Q_N$ and one or more additional partial quotients to produce an estimated final quotient;
 wherein the rounding, dividing, calculating and adding steps are performed by a processor.

2. The method of claim 1, wherein the step of calculating one or more additional partial quotients is performed iteratively.

3. The method of claim 1, wherein the step of calculating one or more additional partial quotients is performed for each divisor bit $Z_{N-1}$ through $Z_0$ having a binary value of "0".

4. The method of claim 1, wherein the step of calculating one or more additional partial quotients includes the step of setting each additional partial quotient to a "0" value if a corresponding divisor bit has a value of "1".

5. The method of claim 1, further comprising the steps of:
 calculating an error component $Q_{ERR}$; and
 adding the error component $Q_{ERR}$ to the estimated final quotient to produce a corrected final quotient.

6. The method of claim 1 further comprising the step of maintaining a counter that is incremented as the partial quotients are generated.

7. The method of claim 6 wherein in calculating a given one of the additional partial quotients a divisor bit value $Z_{N-Y}$ is compared to a specified binary value and if equal to the specified binary value the given additional partial quotient is computed as a function of a previously computed partial quotient, where Y denotes a current value of the counter.

8. The method of claim 7 wherein if the divisor bit value $Z_{N-Y}$ is not equal to the specified binary value the given additional partial quotient is not computed as a function of a previously computed partial quotient.

9. An arithmetic divider unit for dividing a dividend $D_{ZM \ldots Z0}$ having a most significant bit and a plurality of less significant bits by a divisor having a most significant bit $Z_N$ and a plurality of less significant bits $Z_{N-1}$ through $Z_0$, comprising:
 arithmetic logic capable of rounding the divisor to the next significant bit greater than the divisor's most significant bit $Z_N$ to produce a first partial divisor $R_{ZN+1}$;
 shift logic capable of dividing the dividend $D_{ZM \ldots Z0}$ by the first partial divisor $R_{ZN+1}$ to produce a first partial quotient $Q_N$;
 processing a logic capable of calculating one or more additional partial quotients based on one or more divisor bits selected from the plurality of divisor bits $Z_{N-1}$ through $Z_0$; and
 adder logic adding the first partial quotient $Q_N$ and one or more additional partial quotients to produce an estimated final quotient.

10. The arithmetic divider unit of claim 9, wherein the processing logic is capable of iteratively calculating the one or more additional partial quotients.

11. The arithmetic divider unit of claim 9, wherein the processing logic is capable of calculating one or more additional partial quotients for each divisor bit $Z_{N-1}$ through $Z_0$ having a binary value of "0".

12. The arithmetic divider unit of claim 9, wherein the processing logic is capable of setting each additional partial quotient to a "0" value if a corresponding divisor bit has a value of "1".

13. The arithmetic divider unit of claim 9, further comprising:
  processing logic capable of calculating an error component $Q_{ERR}$; and
  adding logic capable of adding the error component $Q_{ERR}$ to the estimated final quotient to produce a corrected final quotient.

14. An integrated circuit comprising the arithmetic divider unit of claim 9.

15. A system for dividing a dividend $D_{ZM...Z0}$ having a most significant bit and a plurality of less significant bits by a divisor having a most significant bit $Z_N$ and a plurality of less significant bits $Z_{N-1}$ through $Z_0$ comprising:
  a processor configured to execute the following steps:
    rounding the divisor to the next significant bit greater than the divisor's most significant bit $Z_N$ to produce a first partial divisor $R_{ZN+1}$;
    dividing the dividend $D_{ZM...Z0}$ by the first partial divisor $R_{ZN+1}$ to produce a first partial quotient $Q_N$;
    calculating one or more additional partial quotients based on one or more divisor bits selected from the plurality of divisor bits $Z_{N-1}$ through $Z_0$; and
    adding the first partial quotient $Q_N$ and one or more additional partial quotients to produce an estimated final quotient.

16. The processor of claim 15, wherein the processor is further configured to calculate one or more additional partial quotients is performed iteratively.

17. The processor of claim 15, wherein the processor is configured to calculate the one or more additional partial quotients for each divisor bit $Z_{N-1}$ through $Z_0$ having a binary value of "0".

18. The processor of claim 15, wherein the processor is configured to set each additional partial quotient to a "0" value if a corresponding divisor bit has a value of "1".

19. The processor of claim 15, wherein the processor is configured to calculate an error component $Q_{ERR}$ and to add the error component $Q_{ERR}$ to the estimated final quotient to produce a corrected final quotient.

20. An integrated circuit comprising the system of claim 15.

* * * * *

UNITED STATES PATENT AND TRADEMARK OFFICE
CERTIFICATE OF CORRECTION

PATENT NO.         : 8,060,551 B2                                                       Page 1 of 1
APPLICATION NO.    : 11/967251
DATED              : November 15, 2011
INVENTOR(S)        : Prasad Avss et al.

It is certified that error appears in the above-identified patent and that said Letters Patent is hereby corrected as shown below:

In the claims:

Claim 9, col. 8, line 49, please delete "processing a logic" and insert --processing logic--.
Claim 16, col. 10, line 6, please delete "quotients is performed iteratively" and insert --quotients iteratively--.

Signed and Sealed this
Tenth Day of January, 2012

David J. Kappos
*Director of the United States Patent and Trademark Office*